Jan. 19, 1971   S. H. BLEDSOE   3,556,582
HOUSE AND BOAT TRAILER APPARATUS
Filed March 27, 1969   2 Sheets-Sheet 1
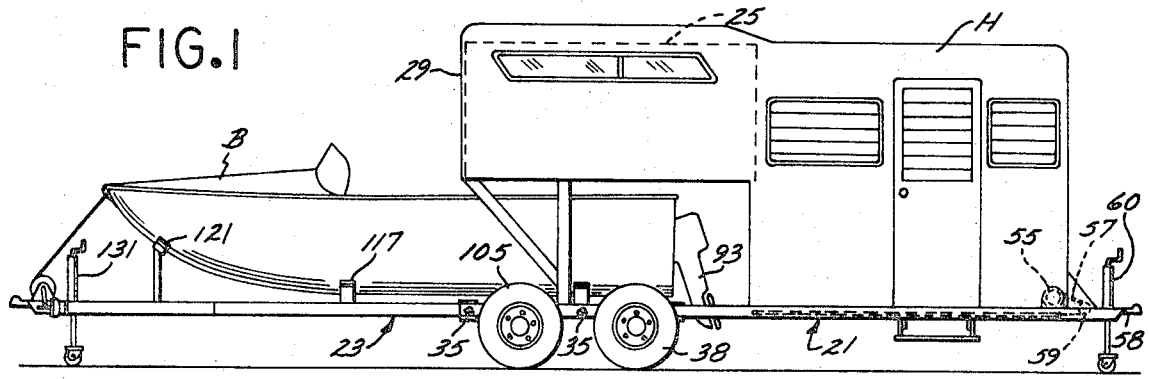
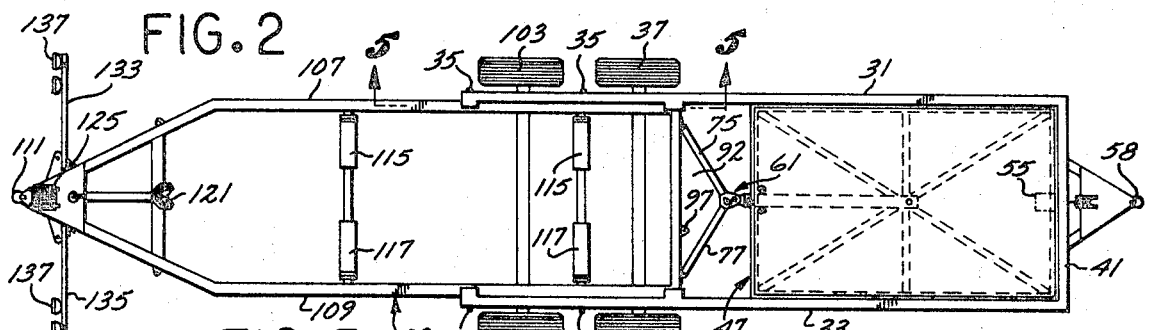
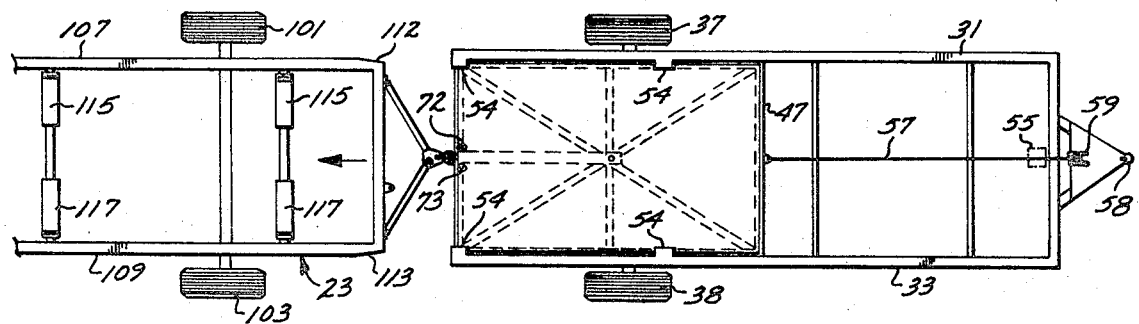
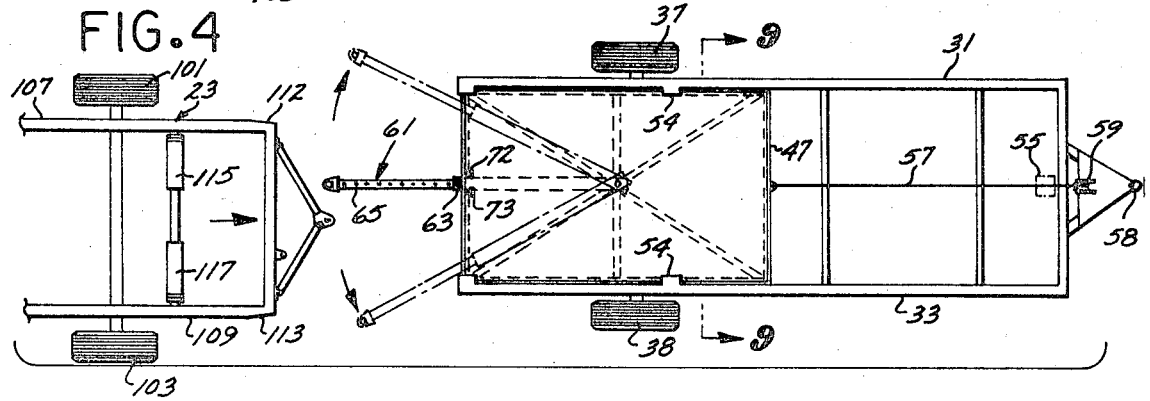
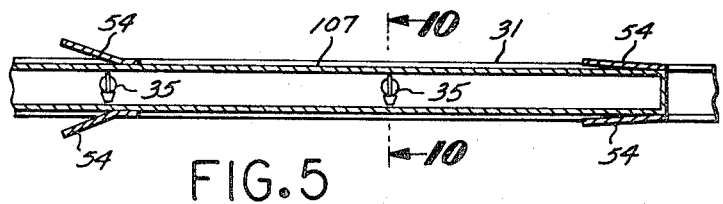
INVENTOR.
SHERMAN H. BLEDSOE
BY Fulwider, Patton, Rieber,
Lee and Utecht
ATTORNEYS

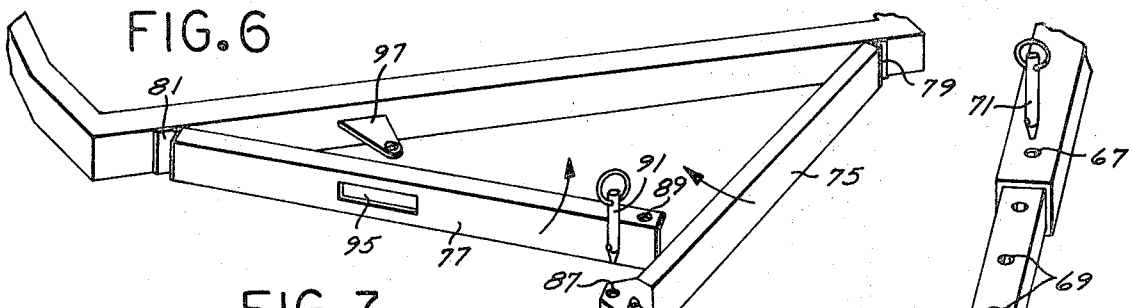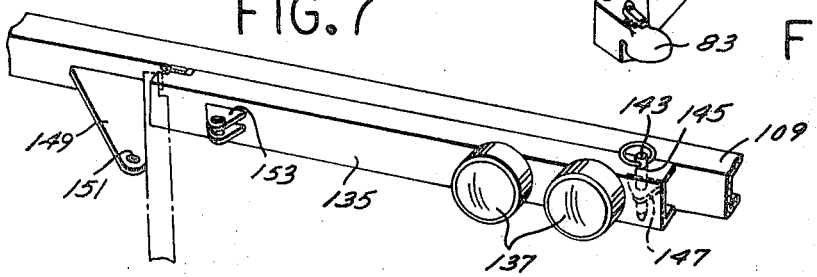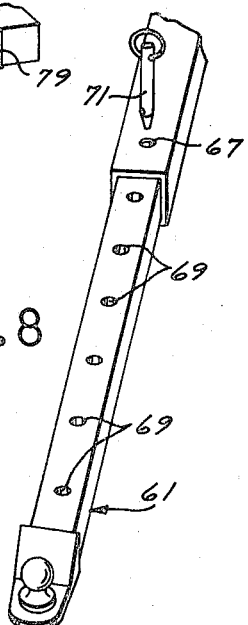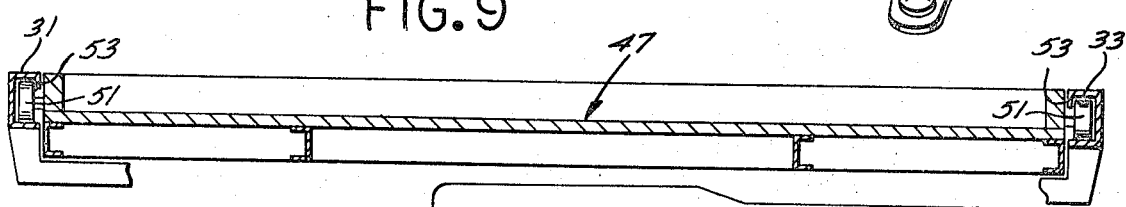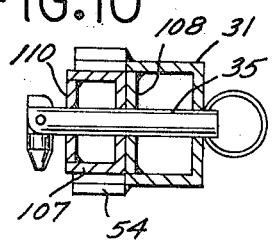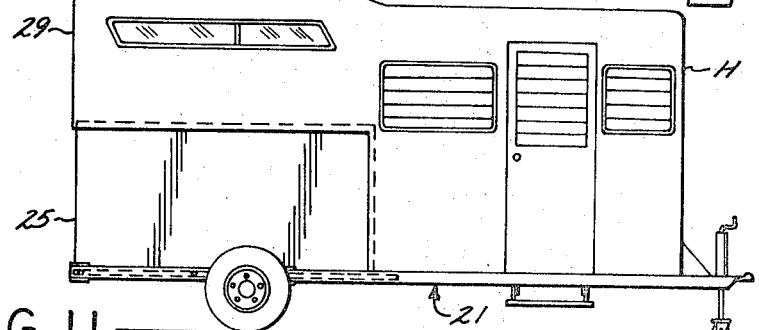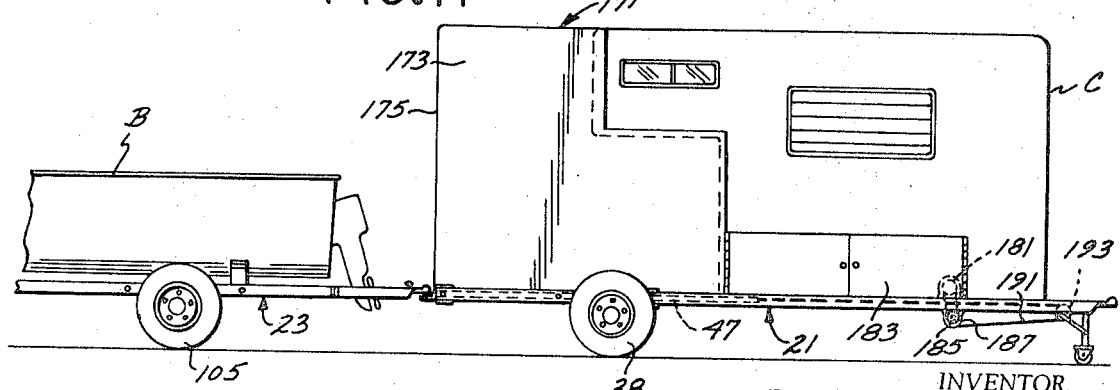

United States Patent Office 3,556,582
Patented Jan. 19, 1971

3,556,582
HOUSE AND BOAT TRAILER APPARATUS
Sherman H. Bledsoe, Temple Bar Marina,
Temple Bar, Ariz. 86443
Filed Mar. 27, 1969, Ser. No. 811,076
Int. Cl. B60p 3/34
U.S. Cl. 296—23                                              10 Claims

ABSTRACT OF THE DISCLOSURE

A house and boat trailer apparatus including a house trailer portion having a frame supported on its rear end by a pair of support wheels. A house trailer closure is mounted on the frame and includes a collapsible rear portion and a forwardly projecting tongue is provided for attachment to a towing vehicle. A rearwardly facing boat trailer portion is provided with a frame for supporting a boat. Such frame is supported on its rear end by a pair of support wheels and includes a tongue at its rearwardly facing front extremity. Coupling means is provided for coupling the rear of the boat trailer portion to the rear of the house trailer portion whereby the collapsible rear portion of the house trailer may be collapsed, the rear of the boat trailer interfitted in the space resulting from such collapse and the trailer portions coupled together in back-to-back relationship so the entire apparatus may be towed by the tongue at the front of the house trailer portion. The house trailer portion may then be parked at its destination and the boat trailer portion uncoupled therefrom and towed independently by its tongue.

BACKGROUND OF THE INVENTION

Field of the invention

The present invention relates generally to trailers and, more particularly, to a trailer apparatus for transporting both a boat and a house trailer.

Description of the prior art

Combination house and boat trailer apparatus have been proposed which include separable trailers but such apparatus suffer the shortcoming of requiring that the support wheels of the respective trailers be shifted longitudinally on their respective trailers to a selected position when the apparatus are towed as a unit. A trailer apparatus of this type is shown in U.S. Pat. No. 3,348,859. Also, house trailers have been proposed which include extensible frames for receiving a boat. A trailer of this type is shown in U.S. Pat. No. 3,380,607. Such trailers have proven unsatisfactory because the house trailer cannot be parked and the boat towed separately therefrom.

It has also been proposed that house trailers be provided with doors on their rear ends for receipt of a boat to be transported. Trailers of this type have been proven unsatisfactory because of the inconvenience of loading the boat in the trailer and also because the boat cannot be transported separately therefrom.

SUMMARY OF THE INVENTION

The present invention is characterized by a house and boat trailer apparatus including separate, oppositely facing trailer portions supported on their rear extremities by respective pairs of wheels. The trailer portions are sufficiently interfitted on their rear extremities to dispose their respective pairs of support wheels in sufficiently close tandem relationship to enable the two portions to be towed as a unit. When the destination is reached, the house trailer may be disconnected and parked and the boat trailer portion may then be conveniently utilized independently for transportation of the boat.

An object of the present invention is to provide a house and boat trailer apparatus which enables both a closure defining living quarters and a boat to be towed by a single vehicle.

Another object of the present invention is to provide a trailer apparatus of the type described wherein the apparatus may be conveniently separated to form an independent house trailer and a boat trailer.

Still another object of the present invention is to provide a trailer apparatus of the type described wherein there is no requirement for shifting the support wheels forwardly or rearwardly on the individual trailer portions when such portions are connected together for towing as a unit.

A further object of the present invention is to provide a trailer apparatus of the type described that includes a movable floor which may be moved forwardly in the house trailer portion to provide a space for receipt of the rear extremity of the boat trailer when such trailer portions are coupled together.

An additional object of the present invention is to provide a trailer apparatus of the type described wherein the trailer portions may be conveniently aligned and coupled together.

These and other objects and the advantages of the present invention will become apparent from a consideration of the following detailed description when taken in conjunction with the accompanying drawings.

DESCRIPTION OF THE DRAWINGS

FIG. 1 is a side elevational view of a house and boat trailer apparatus embodying the present invention;

FIG. 2 is a top plan view of the house and boat trailer apparatus shown in FIG. 1;

FIG. 3 is a partial top plan view similar to FIG. 2 but showing the apparatus during uncoupling of the separate trailer portions;

FIG. 4 is another top plan view similar to FIG. 2 and showing the trailer portions during the coupling together procedure;

FIG. 5 is a vertical sectional view, in enlarged scale, taken along the line 5—5 of FIG. 2;

FIG. 6 is a partial perspective view, in enlarged scale, of the coupling mechanism included in the trailer apparatus shown in FIG. 1;

FIG. 7 is a partial perspective view, in enlarged scale, of the rear of the trailer apparatus shown in FIG. 1;

FIG. 8 is a partial perspective view, in enlarged scale, of a portion of the coupling mechanism included in the trailer apparatus shown in FIG. 1;

FIG. 9 is a vertical sectional view, in enlarged scale, taken along the line 9—9 of FIG. 4;

FIG. 10 is a vertical sectional view, in enlarged scale, taken along the line 10—10 of FIG. 5;

FIG. 11 is a side elevational view of the house trailer shown in FIG. 1 and depicting such trailer in its parked position; and FIG. 12 is a side elevational view of a modification of the trailer apparatus shown in FIG. 1.

DESCRIPTION OF THE PREFERRED EMBODIMENT

The house and boat trailer apparatus of present invention includes, generally, a house trailer portion 21 and a boat trailer portion 23 which face in opposite directions and are coupled together on their rear ends. Referring to FIG. 11, the house trailer portion 21 includes a closure H having a telescopical rear portion, generally designated 25, which telescopes upwardly into a rearwardly projecting overhang 29 to leave a pair of rearwardly extending side frame members 31 and 33 which are spaced apart for receiving the rear extremity of the boat trailer 23 whereby the trailer portions 21 and 23 may be coupled together by connecting pins 35. Thus, the trailer portions 21 and 23 may be coupled together in back-to-back relationship for towing as a unit and, when the destination is reached, such portions may be uncoupled and the house trailer portion 21 parked. The boat trailer portion 23 is then free for towing independently of the house trailer 21.

For the purposes of this description, it will be understood that the term house trailer closure comprehends a camper or any portable living quarters. Further, the front and rear of the respective trailer portions 21 and 23 will be referred to as if the portions were being towed independently. The house trailer portion 21 includes a horizontal frame mounted at its rear extremity on a pair of support wheels 37 and 38 and having a front channel 41 and the side channels 31 and 33. Referring to FIG. 9, the side channels 31 and 33 face inwardly and cooperate to form a track or passageway for receiving a longitudinally moveable floor, generally designated 47. Referring to FIG. 9, the side channels 31 and 33 each define inner tracks for receiving rollers 51 mounted at the sides of the movable floor 47 for supoprt thereof, such channels having downwardly extending lips 53 which hold the wheels 51 captive therein. Referring to FIG. 5, alignment tabs 54 are mounted on the inside of the channels 31 and 33 and angle forwardly and inwardly toward one another to lead the forward extremity of the trailer portion 21 into coupling position.

Referring to FIGS. 1 and 3, a winch 55 is mounted at the front of the house trailer portion 21 and includes a drum which winds a cable 57 that extends forwardly and is reversed around a pulley 59 and extends rearwardly to connect with the front of the moveable floor 47 for winching such floor forwardly in the side channels 31 and 33.

The house trailer portion 21 includes a forwardly projecting tongue 58 that mounts a jack 60 for supporting such tongue when such portion is parked.

An extensible tongue, generally designated 61, is pivotally mounted at its front end to the underside of the movable floor 47 and includes a female portion 63 and a telescopical male portion 65. Referring to FIG. 8, the female portion 63 includes a pin-receiving bore 67 and the male portion includes a series of bores 69 selectively alignable with the bore 67 for receipt of an adjustment pin 71. Referring to FIG. 4, a pair of removable alignment pins 72 and 73 are received in bores in the rear extremity of the moveable floor 47, one pin being disposed on either side of the tongue 61.

The front end of the boat trailer portion 23 includes a pair of struts 75 and 77 which are mounted at their outer ends from the rear extremity of such trailer by means of respective hinges 79 and 81. The strut 75 carries a male coupling 83 which is received over the ball connector of the extensible tongue 61 and the back side of such coupling is formed with a cavity for receiving the free extremity of the strut 77. The coupling 83 includes a vertical bore 87 which is registerable with a bore 89 in the free extremity of the strut 77 to receive a connector pin 91 which holds the coupling struts 75 and 77 in the triangular position shown in FIGS. 2 and 3 to form a central opening 92 for projection of the downwardly extending shank 93 of an outboard motor as shown in FIG. 1. The strut 77 is formed intermediately with a longitudinal slot 95 for receipt of a forwardly projecting flange 97 mounted on the front of the boat trailer portion 23 whereby the member 77 may be folded into juxtaposition with the rear member of the trailer portion 23 and the strut 75 may be folded thereover and the pin 91 inserted in the bore 87 and in the flange 97 to hold the struts 75 and 77 in their collapsed position.

Referring to FIGS. 1 through 4, the boat trailer portion is supported at its rear extremity on a pair of support wheels 103 and 104 and includes a frame having side channels 107 and 109 which turn inwardly on their front extremities and join to form a tongue mounting a connector 111 for attachment of such trailer portion to a towing vehicle. Referring to FIG. 10, the side channels 107 and 109 are spaced to complementally interfit the channels 31 and 33 and are in juxtaposition with pads 108 welded to the inside of the channels 31 and 33. Pads 110 are welded to the open side of the channels 107 and 109 and bores are drilled through the combination for receipt of the connecting pins 35. The side channels 107 and 109 are tapered inwardly slightly at 112 and 113 whereby the rear extremity of the trailer 23 will be conveniently led between the channels 31 and 33 of the trailer 21. The boat trailer frame includes two pairs of transverse boat support pads 115 and 117 and a bow stop 121. A manual winch 125 is mounted at the front of the boat trailer portion 23 for winching the boat B onto such trailer portion.

A jack 131 is mounted at the front of the boat trailer portion 23 for supporting such trailer in the position shown in FIG. 1.

Mounted on opposite sides of the front extremity of the boat trailer portion 23 are a pair of pivotal wings 133 and 135 which are foldable from the position shown in FIG. 2 to the position shown in FIG. 9 and mount tail lights 137. Referring to FIG. 7, the side frame members 107 and 109 include tabs 141 having bores therein for receipt of a fastening pin 143 which is received through bores 145 in the respective wings 133 and 135 to hold such wings in their retracted position. The side members 107 and 109 also include flanges 149 having bores 151 therein, and clevices 153 are mounted on the respective wings 133 and 135 and are received over the respective flanges 149 when the wings 133 and 135 are swung to their extended positions. Connector pins 143 are inserted through the respective flanges 149 and clevices 153 to maintain the respective wings 133 and 135 in their extended positions.

In operation, the trailer portions 21 and 23 are coupled together by connecting the tongue 58 of the house trailer portion 21 to a towing vehicle and backing such trailer toward the front of the boat trailer portion 23. The adjustment pin 71 will be pulled to free the extensible tongue 61 for extension to reach the connector 83 at the front of the boat trailer portion 23. Assuming the trailer portions 21 and 23 are misaligned as shown in FIG. 4, the alignment pin 73 is then pulled to enable the tongue 61 to pivot to the right for connection with the connector 83. The house trailer portion 21 may then be pulled ahead to cause the boat trailer portion 23 to align therewith and the alignment pin 73 may be re-inserted. The house trailer portion 21 may then be backed rearwardly to cause the tongue 61 to telescope on itself, and the tongue adjustment pin 71 inserted in the last bore 69 to hold such tongue fully telescoped. The moveable floor 47 may then be moved forwardly under the closure H by actuating the winch 55 and/or backing the house trailer portion 21 further rearwardly.

It will be noted that the tapered shape formed by the tapers 112 and 113 at the forward extremity of the boat trailer portion 23 assists in alignment of the trailer portions 21 and 23 as the front extremity of the boat trailer portion 23 is lead between the rear extremity of the side channels 31 and 33. Further, the vertical alignment tabs 54 also assist in leading the front extremity of the boat trailer portion 23 into position. When the moveable floor 47 has been moved to its forward storage position under the closure H, the pins 35 may be inserted to secure coupling of the trailer portions 21 and 23. The jack 131 of the boat trailer portion 23 may then be raised and the wings 133 and 135 swung to their extended position shown in FIG. 2 and the fastening pins 143 inserted in the clevices 153 and bores 151 to hold such wings in said extended position. The trailer apparatus is then ready for towing by the tongue 58 and can be towed as a unit thus eliminating the necessity of making two trips to transport a house trailer and then the boat B.

When the destination is reached, the boat jack 131 may be lowered and the coupling pins 35 pulled to free the trailer portions 21 and 23 for separation. The brake in the winch 55 will be released to feed the cable 57 out and enable the moveable floor 47 to be moved to its rearward position under the overhang 29. The connector 83 may then be disconnected from the ball of the tongue 61 and the boat trailer 23 will then be free. The house trailer portion 21 may then be towed to its parking location and the jack 60 lowered and the towing vehicle disconnected therefrom. The telescopical portion 25 may then be lowered and the moveable floor 47 can serve as a floor support for the resulting enclosure. It will be noted that facilities, such as bunks, etc., may be permanently located in the telescopical portion 25 and will be ready for use when such portion is lowered and that such portion may telescope vertically as shown or forwardly and rearwardly, as desired. The entry way to the portion 29 may be from the rear or directly from the closure H.

The wings 133 and 135 of the boat trailer portion 23 may then be folded to their collapsed position shown in FIG. 9 and the towing vehicle may be connected to the connector 111. The connecting pin 91 may then be pulled from the hinged struts 75 and 77 and such struts folded against the front beam of the boat trailer portion 23. The towing vehicle may then be connected to the connector 111 of the boat trailer portion 23 and the jack 131 raised to enable such trailer portion to be towed away for transportation of the boat B.

It will be understood that the manual winches and coupling means described hereinabove may be conveniently converted to conventional electric or hydraulic winches or coupling means.

The boat and house trailer apparatus shown in FIG. 12 is substantially similar to that shown in FIGS. 1 through 11 except that the closure portion of the house trailer is a conventional camper, generally designated 171, and includes a pair of sidewalls 173 and a rear wall 175 for defining a room at the rear end of such camper. With this construction, the moveable floor 47 will, when in its rearward position, serve as a floor for the consequent auxiliary room 171. Conveniently, the sidewalls 173 may be constructed for folding and could be collapsed and stored in the space between the moveable floor 47 and the floor of the camper C (FIG. 9).

Also, it will be noted that a winch 181 is mounted in the compartment 183 at the side of the camper C and drives a shaft 185 which mounts a drum 187 located centrally of the trailer portion 23, such drum winding a cable 191 that wraps around a pulley 193 and projects rearwardly to connect with the forward end of the moveable floor 47. The trailer apparatus shown in FIG. 12 is operated essentially the same as that described above except that the walls 173 and 175 are removed before the trailers 21 and 23 are coupled together rather than being telescoped into an overhang.

From the foregoing, it will be apparent that the trailer apparatus of present invention provides convenient means for transporting both a house trailer and a boat to a particular destination without the necessity of towing two separate trailers. This is of particular importance in States where towing of two trailers is prohibited by law. Further, once the destination is reached, the house trailer may be parked to reserve a desirable camping site and the boat trailer portion will be free for transportation of the boat to and from the water. Likewise, the towing vehicle will be free for passenger transportation.

Various modifications and changes may be made with regard to the foregoing detailed description without departing from the spirit of the invention.

I claim:

1. House and boat trailer apparatus comprising:

a house trailer portion including a frame supported at its rear extremity by a pair of wheels and having a main tongue at its front extremity;

a closure mounted on said trailer portion and including a collapsible rear portion which may be collapsed to form a boat-receiving space to be occupied by the rear extremity of a boat;

a rearwardly facing trailer portion including a frame for carrying said boat and supported at its rear end by a pair of wheels, the rear end of said boat and trailer being receivable sufficiently far into said boat-receiving space to space said pairs of wheels relatively close together in tandem relationship, said boat trailer portion further including an auxiliary tongue at its front extremity; and coupling means for coupling said trailer portions together whereby said rear portion of said closure may be collapsed and the rear extremity of said boat and trailer received thereinto, said boat portions coupled together and towed by said main tongue and, when the destination is reached, said portions uncoupled and separated and said house trailer portion parked thus freeing said boat trailer portion for towing said boat.

2. House and boat trailer apparatus as set forth in claim 1 wherein:

said closure includes an overhang portion projecting rearwardly over said boat when said trailer portions are coupled together and said boat is loaded on said boat trailer portion.

3. House and boat trailer apparatus as set forth in claim 1 wherein:

said coupling means includes a rearwardly projecting telescopical tongue pivotally connected on its front extremity to said house trailer portion and including connecting means on its rear extremity for connection with the rear end of said boat trailer portion whereby said telescopical tongue may be extended and pivoted to one side to connect with said boat trailer portion and said house trailer portion then towed ahead to bring said telescopical tongue into axial alignment with said apparatus and said telescopical tongue retracted to couple said trailer portions together in close spaced relationship.

4. House and boat trailer apparatus as set forth in claim 1 wherein:

said coupling means includes an extensible tongue connected on its front extremity to said house trailer portion and including connecting means on its rear extremity for connection with the rear extremity of said house trailer portion.

5. House and boat trailer apparatus as set forth in claim 1 wherein:

said house trailer portion includes a pair of rearwardly projecting side members which are laterally spaced for receiving the rear extremity of said boat trailer portion therebetween when said trailer portions are coupled together.

6. House and boat trailer apparatus as set forth in claim 1 wherein:

said coupling means includes a pair of struts pivotally carried at their laterally outer ends by the rear end of said house trailer portion frame and releasably securable together at their free ends to form a triangular cavity for extension of the downwardly projecting shaft of an outboard motor mounted on the rear of said boat, said struts, when released at their free ends, being foldable into position against the front of said boat trailer portion and one of said struts mounting a connector on its free end for connection to the rear end of said house trailer portion.

7. House and boat trailer apparatus as set forth in claim 1 wherein:

said closure includes a camper having an overhang projecting rearwardly over said boat-receiving space and cooperating with said rear portion when said rear portion is extended to define a room at the front of said camper.

8. House and boat trailer apparatus as set forth in claim 1 wherein:
   said boat trailer portion is formed with a longitudinal track extending under said closure and said trailer portion includes a moveable floor received in said track and shiftable from a stored position under said closure to a rear position forming a floor for said collapsible rear portion.

9. House and boat trailer apparatus as set forth in claim 8 that includes:
   means for shifting said moveable floor to its stored position under said closure.

10. House and boat trailer apparatus as set forth in claim 8 wherein:
    said coupling means includes a coupling tongue connected to said moveable floor and moveable forwardly and rearwardly therewith.

References Cited

UNITED STATES PATENTS

| | | | |
|---|---|---|---|
| 3,446,516 | 5/1969 | Modglin | 280—414X |
| 2,847,136 | 8/1958 | Neff | 296—23B |

PHILIP GOODMAN, Primary Examiner

U.S. Cl. X.R.

214—500; 280—414